A. R. WEISZ.
SCREW CUTTER.
APPLICATION FILED JULY 9, 1907.
919,271. Patented Apr. 20, 1909.
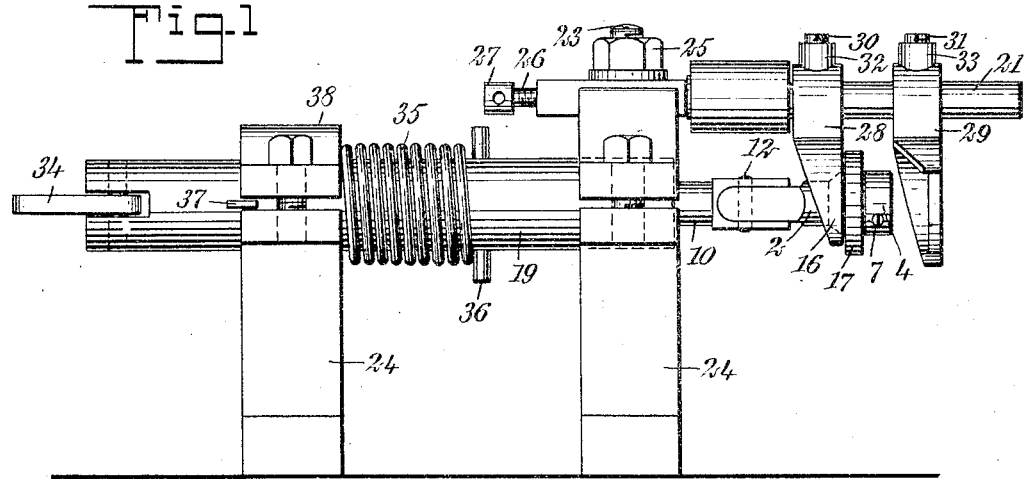
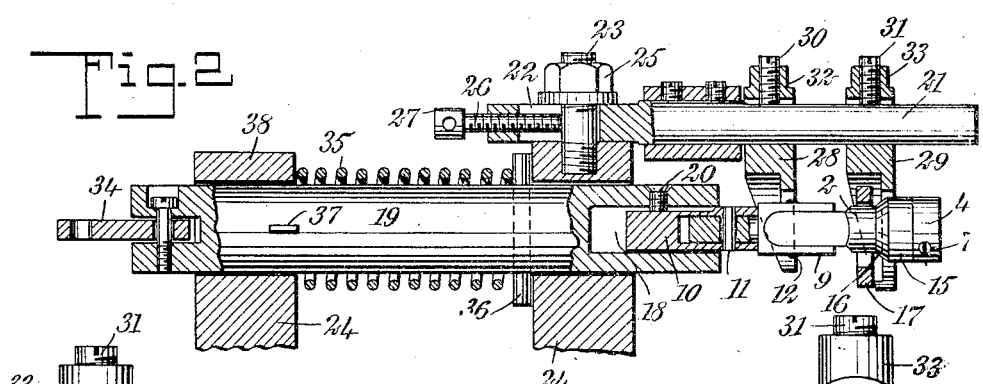
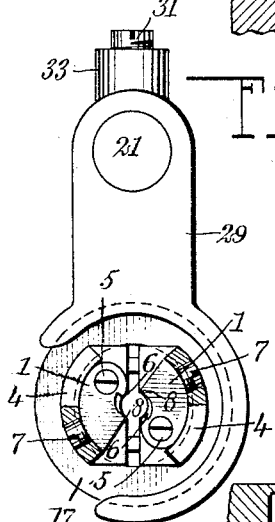
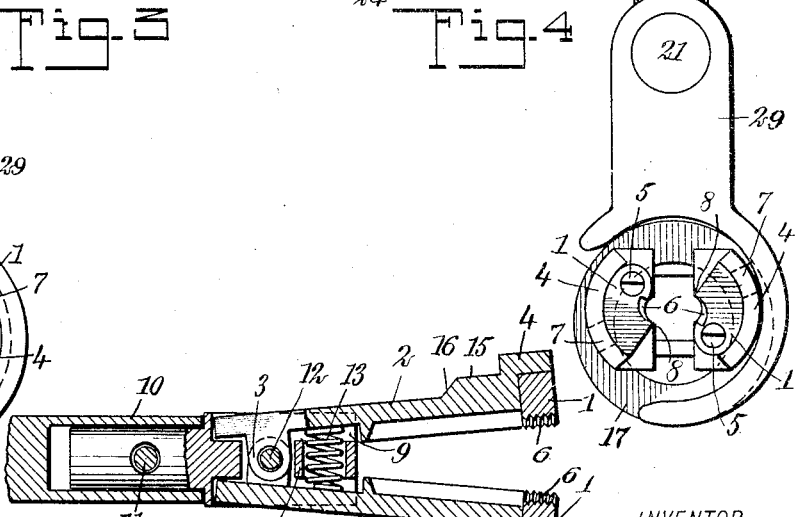
WITNESSES
INVENTOR
Albert R. Weisz
BY
ATTORNEYS

UNITED STATES PATENT OFFICE.

ALBERT RICHARD WEISZ, OF NEW YORK, N. Y., ASSIGNOR TO MATCHLESS CIGAR LIGHTER COMPANY, OF NEW YORK, N. Y.

SCREW-CUTTER.

No. 919,271.　　　　Specification of Letters Patent.　　　　Patented April 20, 1909.

Original application filed April 23, 1906, Serial No. 313,193. Divided and this application filed July 9, 1907. Serial No. 382,851.

*To all whom it may concern:*

Be it known that I, ALBERT R. WEISZ, a citizen of the United States, and a resident of the city of New York, borough of Brooklyn, in the county of Kings and State of New York, have invented a new and Improved Screw-Cutter, of which the following is a full, clear, and exact description.

This invention is a division of the subject-matter contained in an application filed by me April 23, 1906, for automatic screw making machine, Serial Number 313,193, and has for its object to provide a screw cutting device which is simple in construction, effective in operation and durable in use, adapted to be readily sharpened when required, and so constructed as to be capable of being accurately adjusted to screws of different diameters.

Other objects relating to the specific construction and special arrangement of the several parts of my invention will be understood from the following description and accompanying drawings, in which drawings like characters of reference indicate like parts throughout the views, and in which—

Figure 1 is a side elevation of a device embodying my invention and operating mechanism connected therewith, the stock supporting the screw cutters being shown in its retracted position; Fig. 2 is a sectional elevation, partly broken away, of the device shown in Fig. 1, showing the screw cutting device arranged in its projected position; Fig. 3 is an end view of the device shown in Fig. 1; Fig. 4 is an end view of the device shown in Fig. 2; and Fig. 5 is a sectional elevation of thread cutters mounted upon jaws pivotally attached to a stock.

As illustrated in the drawings, arc cutters 1 are mounted upon the outer ends of two jaws 2 constituting the die holders, and each jaw is provided near its inner end with an aperture-hinged lug 3. The outer end of each jaw is provided with a recessed segmental head having an arc rim 4, in which the arc screw cutters are held by means of screws 5 which pivotally attach the ends of the thread cutters to the heads of the jaws. The supporting screws of the cutters are arranged reversely to each other so that the screw of each cutter is arranged opposite the free end of the opposing cutter. The cutters are provided on their inner edge with threads 6 and the free ends of the cutters are faced at an angle to the threads of the cutter to form a cutting edge 8, and also to enable the cutting edge to be readily sharpened by simply grinding down the face end of the cutter which extends at an angle to the thread. The threaded portion of the cutters is preferably cut away so as to recede more abruptly than in a circular line from the free end of the cutters, thereby arranging the threads of the cutters eccentrically to the axis of the cutters and making a clearance back of the cutting edge formed by the beveled free end of the cutters with the threaded portion thereof. Adjusting screws 7 have a threaded engagement with the rim 4 of the head of the jaws, and at their inner ends bear against the free ends of the cutters, whereby the cutting edge 8 of said ends of the cutters may be adjusted accurately to cut threads on screws of different diameters. The inner ends of the jaws 2 are inserted in the forked outer end 9 of a stock, which stock is inserted in a sleeve 10, and is held in place in the sleeve by means of a screw or pin 11, which passes through said sleeve and an aperture in said stock. A pivot pin 12 is passed through the forked end 9 of the stock, and through the apertured lug 3 of the jaws 2, whereby said jaws are pivotally mounted in the stock in such a manner that they can swing toward and from each other. The jaws are pressed apart by a helical spring 13 inserted between them and held in place in an apertured block 14 formed on the forked end 9 of the stock. Each jaw is provided adjacent to its head with a substantially semi-cylindrical shoulder 15 off-set from the shank of the jaws, and adjacent to said part and toward the hinged end of the jaws with a beveled part 16, and a ring 17 having an inner diameter adapted to engage the off-set shoulders 15 so as to surround and embrace the jaws 2. The sleeve 10 is inserted in a socket 18 formed in the end of a mandrel 19, and is held therein by a screw 20. A horizontal arm 21 having a longitudinal slot 22 is held by a stud bolt 23 passing through said slot 22 on the top of a standard 24, and is secured in place on the standard by means of a nut 25. A screw 26 extending in the direction of said arm engages the end of the arm 21 and passes freely through the slot 22, bearing with its free end against the bolt 23, and this screw is provided with a suitable head 27 on its outer end. On the arm 21 ring shaped stops 28 and 29 are held stationary by binding screws 30 and 31 mounted on lugs 32 and 33 of said stops respectively. The mandrel 19 is pivotally connected at its outer end with a link 34, which in turn may be connected with any suitable means for moving the mandrel lengthwise in its bearings in the standards 24 in one direction. A helical spring 35 surrounds said mandrel between the standards 24, and is held normally in position by means of one of said standards, a pin 36, and a key or flat stud 37, the latter being adapted to slide between one of the standards 24 and its cap 38.

When the device is in operation and the mandrel 19 is retracted in its bearings in the standards 24 by means of any suitable automatically operating mechanism, the jaws 2 are drawn into the ring 17, which is held in position by the stop 28, as illustrated in Fig. 1 of the drawing. As the backward pressure on the mandrel 19 is released, the spring 35 projects the mandrel 19 and threaded cutters, bringing the cutters in contact with a rod upon which a thread is to be cut. The spring 35 serves as feeding mechanism for feeding the cutters on said rod, while the rod may be held in a suitable rotating chuck. After the thread has been cut to the desired length, the ring 17 on the jaws comes in contact with the stop 29 and the feeding tension of the spring 35, forcing the mandrel 19 outward, strips the ring from the jaws of the cutter, thereby permitting the spring 13 between said jaws to separate the jaws from each other and from the rod operated upon. After the ring 17 has been stripped from the jaws of the cutter, the mandrel 19 and the jaws supported therein are gradually retracted in the standards 24 and the spring 35 thereby compressed, at the same time the ring 17 is brought in contact with the stop 28 which arrests the movement of the same, thus forcing the ring up the beveled surface 16 of the jaws of the cutters, whereby said jaws are again pressed together and held in closed position ready for the next thread cutting operation. In order to permit of adjusting the parts according to the desired length of the screw thread, the nut 25 is loosened and the screw 26 turned until the two pushers 28 and 29 are in proper position relatively to the die holding jaws. And the pushers may be adjusted on their supporting arm 21 to regulate the extent of thread cut on the blank.

Having thus described my invention, what I claim as new and desire to secure by Letters Patent is:

1. In a screw cutter, the combination with two longitudinally movable pivoted die holding jaws and means for pressing them apart, each jaw having a substantially semi-cylindrical part and a beveled part adjacent to said semi-cylindrical part, of a ring adapted to surround the cylindrical part of said jaws, two stops held at opposite sides of the ring, and means for moving the jaws lengthwise.

2. In a screw cutter, the combination with a longitudinal movable mandrel, of pivoted die holding jaws supported in said mandrel, and provided with rounded shoulders off set from the shank of said jaws, a spring arranged between said jaws for pressing them apart, a ring having an inner diameter adapted to receive the off-set shoulders of said jaws, a standard, an arm adjustable longitudinally on said standard, and stops adjustably mounted on said arm on opposite sides of said ring.

3. In a screw cutter, the combination with a longitudinal movable mandrel, of pivoted die holding jaws supported in said mandrel and having rounded shoulders off-set from the shanks of said jaws, of a spring arranged between said jaws for pressing them apart, a ring having an inner diameter adapted to receive the off-set shoulders of said jaws, a supporting arm, stops adjustably secured on said arm at opposite sides of said ring, a standard supporting said arm, and means for adjusting the arm bodily on the standard.

4. In a screw cutter, the combination with a longitudinally movable mandrel, of pivoted die holding jaws supported in said mandrel, each provided with a rounded shoulder off-set from the shank of said jaws, of a spring arranged between said jaws, a ring having an inner diameter adapted to engage the off-set shoulders of said jaws, a standard, an arm mounted on said standard and provided with a longitudinal slot, and stops secured to said arm on opposite sides of said ring.

5. In a screw cutter, the combination with suitable supports, of a mandrel having a longitudinal sliding engagement with said supports, a spring connected with said mandrel and adapted to move said mandrel in one direction, pivoted die holding jaws mounted on said mandrel, each jaw being provided with a rounded shoulder off set from the shank of the jaws, a ring having an inner diameter adapted to receive the shoulders of the jaws, an arm mounted on one of said standards, and stops arranged on opposite sides of said ring mounted on said arm, and adjustable relatively to each other.

Signed at New York city, in the county of New York and State of New York this 13th day of June 1907.

ALBERT RICHARD WEISZ.

Witnesses:
JOHN P. DAVIS,
ROBERT W. HARDIE.